United States Patent
Kwak et al.

(10) Patent No.: US 8,085,972 B2
(45) Date of Patent: Dec. 27, 2011

(54) PROTECTION METHOD FOR PREVENTING HARD COPY OF DOCUMENT FROM BEING RELEASED OR REPRODUCED

(75) Inventors: Young-Min Kwak, Gardena, CA (US); Chung-Chieh Kuo, Taipei (TW); Xu-Hua Liu, Beijing (CN); Ying-Jieh Huang, Taipei County (TW)

(73) Assignee: Primax Electronics Ltd., Neihu, Taipei (TW)

( * ) Notice: Subject to any disclaimer, the term of this patent is extended or adjusted under 35 U.S.C. 154(b) by 821 days.

(21) Appl. No.: 12/168,044

(22) Filed: Jul. 3, 2008

(65) Prior Publication Data

US 2010/0002903 A1     Jan. 7, 2010

(51) Int. Cl.
  *G06K 9/00*    (2006.01)
  *G06K 9/46*    (2006.01)
  *H04N 1/44*    (2006.01)
  *G06F 21/00*   (2006.01)

(52) U.S. Cl. ........ 382/100; 382/112; 382/173; 382/176; 382/180; 382/194; 358/3.28; 705/57; 705/58

(58) Field of Classification Search .......... 382/100, 382/112, 173, 176, 180, 199, 194; 358/3.28; 705/57, 58

See application file for complete search history.

(56) References Cited

U.S. PATENT DOCUMENTS

| | | | |
|---|---|---|---|
| 4,823,393 A | 4/1989 | Kawakami | |
| 5,696,594 A | 12/1997 | Saito | |
| 5,788,285 A * | 8/1998 | Wicker | 283/93 |
| 5,790,693 A | 8/1998 | Graves | |
| 5,853,197 A * | 12/1998 | Mowry et al. | 283/93 |
| 5,992,601 A | 11/1999 | Mennie | |
| 6,209,922 B1 * | 4/2001 | Klein | 283/72 |
| 6,621,919 B2 | 9/2003 | Mennie | |
| 6,771,813 B1 | 8/2004 | Katsuyama | |
| 7,085,399 B2 * | 8/2006 | Suzaki | 382/100 |
| 7,209,582 B2 | 4/2007 | Takahashi | |
| 7,243,952 B2 * | 7/2007 | Shimada et al. | 283/93 |
| 7,362,423 B2 | 4/2008 | Masten | |
| 7,362,891 B2 | 4/2008 | Jones | |
| 7,366,337 B2 | 4/2008 | Kortum | |
| 7,542,584 B2 * | 6/2009 | Abe et al. | 382/100 |
| 2002/0044677 A1 | 4/2002 | Fox | |

(Continued)

OTHER PUBLICATIONS

Luo, W. (2004). Object-related Illustration Watermarks in Cartoon Images. Informally published manuscript, Department of Simulation an dGraphics, Otto-von-Guericke University Magdeburg, Magdeburg, Germany.*

(Continued)

*Primary Examiner* — Michael A Newman
(74) *Attorney, Agent, or Firm* — Winston Hsu; Scott Margo

(57) ABSTRACT

A protection method for preventing a hard copy of a document from being released or reproduced is provided. The protection method comprises: selecting a pattern with a closed contour line and utilizing a level set method to process the pattern to generate at least a watermark; and embedding the watermark into the document. In addition, the protection method can further comprise: detecting the hard copy of the document to determine whether at least a watermark exists in the hard copy of the document; and forbidding releasing or reproducing the document when the watermark is detected in the hard copy of the document.

7 Claims, 9 Drawing Sheets

U.S. PATENT DOCUMENTS

| | | | |
|---|---|---|---|
| 2002/0126842 A1* | 9/2002 | Hollar | 380/201 |
| 2003/0121753 A1 | 7/2003 | Stromme | |
| 2004/0247169 A1 | 12/2004 | Ross | |
| 2005/0078331 A1* | 4/2005 | Guan et al. | 358/1.14 |
| 2006/0008112 A1* | 1/2006 | Reed et al. | 382/100 |
| 2006/0280331 A1* | 12/2006 | Chosson et al. | 382/100 |
| 2007/0104350 A1* | 5/2007 | Maeno | 382/100 |
| 2007/0147929 A1* | 6/2007 | Ishimoto et al. | 400/62 |
| 2007/0154079 A1 | 7/2007 | He | |
| 2008/0018942 A1* | 1/2008 | Komiya | 358/3.28 |
| 2008/0069427 A1 | 3/2008 | Liu | |
| 2008/0180751 A1* | 7/2008 | Simske et al. | 358/3.28 |
| 2009/0169115 A1* | 7/2009 | Hu et al. | 382/209 |

OTHER PUBLICATIONS

Flesia, et al. "Implications for Image Watermarking of Recent Work in Image Analysis and Representation." IWDW'02 Proceedings of the 1st international conference on Digital watermarking . (2002): 1-17. Print.*

Chen, et al. "Recent Developments in Document Image Watermarking and Data Hiding." Proc. SPIE Conf on Multimedia Systems and Applications IV. (2001): 166-176. Print.*

Wu, et al. "Authentication of Binary Document Images Based on Embedding the BCH Codes of Watermarks." Asian Journal of Health and Information Sciences. 1.4 (2007): 446-455. Print.*

* cited by examiner

You can apply a different color, apply a texture or picture instead of color, or change settings for patterns and gradients.

1. On the Format menu, point to Backgroud.
2. Do one of the following:
    ? Click the color you want.
    ? Click More Colors to see additional color choices.
    ? Click Fill Effects to change or add specail dffects, such as gradients, texteures, or patterns.

FIG. 6

PROTECTION METHOD FOR PREVENTING HARD COPY OF DOCUMENT FROM BEING RELEASED OR REPRODUCED

BACKGROUND OF THE INVENTION

1. Field of the Invention

The present invention is related to the protection method of a document, and more particularly, to the protection method for preventing the hard copy of a document from being released or reproduced.

2. Description of the Prior Art

In general, confidential documents are not allowed to be released or reproduced arbitrarily. The confidential documents can be soft version computer files or hard copy of the computer files. For the case of soft version, Adobe Acrobat® has lots of methods to protect those documents to be read and printed. The owner of the original file can set password for the document to be accessed and also make the document read-only without printing. MS word also can control the confidential document by setting password. Thus, it is easier to keep the confidential document unreleased if it is not printed. However, once the confidential documents are printed, it is very hard to prevent the confidential documents from released or reproduced.

SUMMARY OF THE INVENTION

It is therefore one of the objectives of the present invention to provide the protection method for preventing a hard copy of a document from being released or reproduced, so as to solve the above problem.

In accordance with an exemplary embodiment of the claimed invention, a protection method for preventing a hard copy of a document from being released or reproduced is disclosed. The protection method comprises: selecting a pattern with a closed contour line and utilizing a level set method to process the pattern to generate at least a watermark; and embedding the watermark into the document.

In accordance with an exemplary embodiment of the claimed invention, a protection method for preventing a hard copy of a document from being released or reproduced is disclosed. The protection method comprises: detecting the hard copy of the document to determine whether at least a watermark exists in the hard copy of the document; and forbidding releasing or reproducing the document when the watermark is detected in the hard copy of the document.

These and other objectives of the present invention will no doubt become obvious to those of ordinary skills in the art after reading the following detailed description of the preferred embodiment that is illustrated in the various figures and drawings.

BRIEF DESCRIPTION OF THE DRAWINGS

FIG. 6 shows a result of embedding the watermark shown in FIG. 5 into a document.

DETAILED DESCRIPTION

The present invention relates to a protection method for preventing a hard copy of a document (such as a confidential document) from being released or reproduced, and this document will describe several exemplary embodiments that apply the method of the present invention. However, a person of average skill in the pertinent art should understand that the present invention can be applied to various types of monetary banknotes and is not limited to the particular embodiments described in the following paragraphs or to the particular manner in which any features of such embodiments are implemented. For example, the protection method of the present invention can be applied to one of a copier, a scanner, a printer, and a multi-functional printer.

Prior to a concise description of the present invention protection method, it is important to understand that certain terms used throughout the following description and claims will refer to particular processes or steps. As one skilled in the art will appreciate, designers may refer to such processes by different names. This document does not intend to distinguish between items that differ in name but function. In the following discussion and in the claims, the terms "including" and "comprising" are used in an open-ended fashion, and thus should be interpreted to mean "including, but not limited to . . . ". Other examples are equally applicable, and should be understood to those familiar with the proper terminology of the related art.

Figure 1:
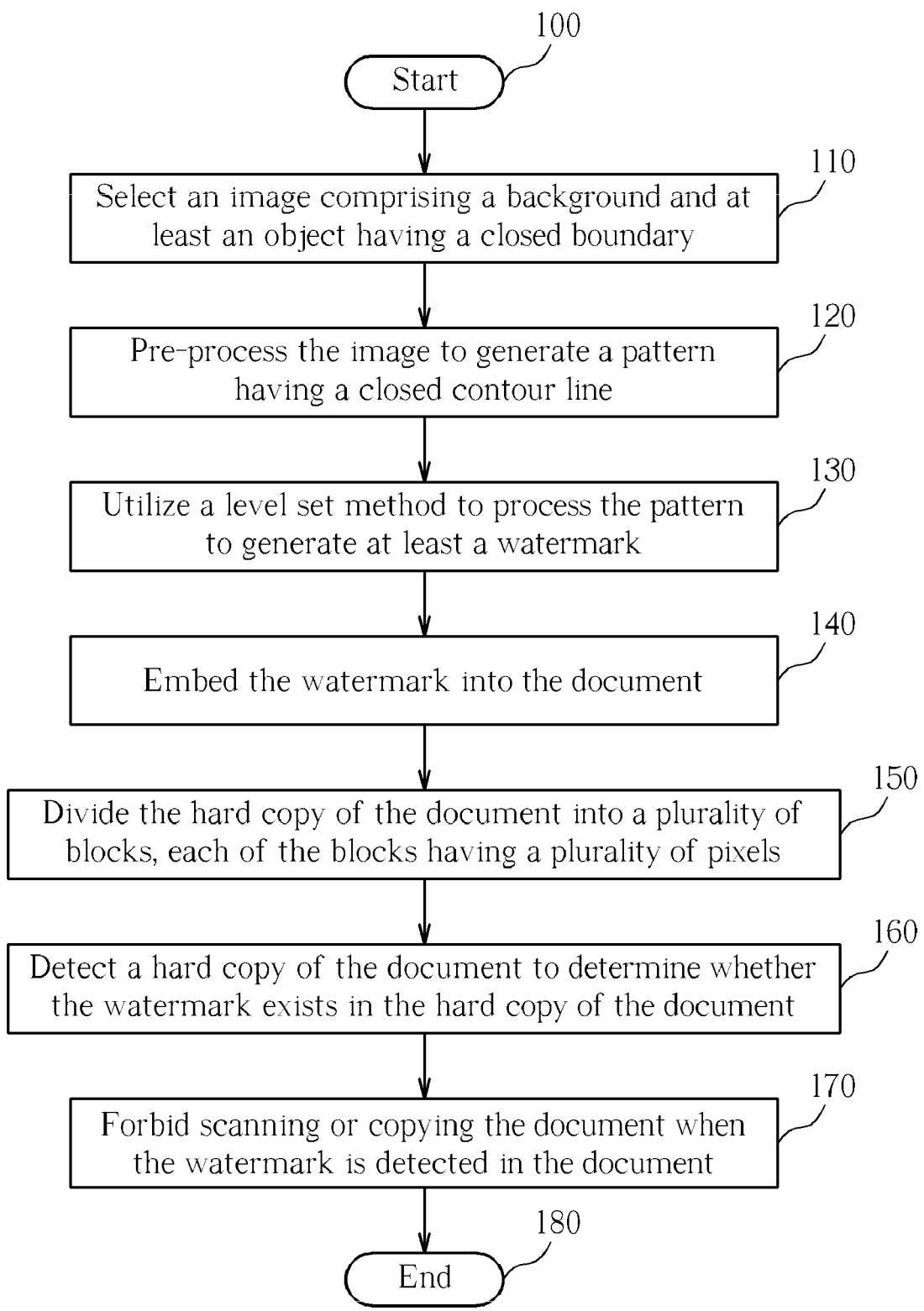
FIG. 1 is a flowchart of a protection method for preventing a hard copy of a document from being released or reproduced in accordance with an embodiment of the present invention.

Please refer to FIG. 1. FIG. 1 is a flowchart of a protection method for preventing a hard copy of a document from being released or reproduced in accordance with an embodiment of the present invention. Provided that substantially the same result is achieved, the steps of process need not be in the exact order shown and need not be contiguous: other steps can be intermediate. The present invention protection method comprises:

Step 100: Start.

Step 110: Select an image comprising a background and at least an object having a closed boundary.

Step 120: Pre-process the image to generate a pattern having a closed contour line.

Step 130: Utilize a level set method to process the pattern to generate at least a watermark.

Step 140: Embed the watermark into the document.

Step 150: Divide the hard copy of the document into a plurality of blocks, each of the blocks having a plurality of pixels.

Step 160: Detect a hard copy of the document to determine whether the watermark exists in the hard copy of the document.

Step 170: Forbid scanning or copying the document when the watermark is detected in the document.

Step 180: End.

Please note the Step 110 to the Step 140 is about generating and embedding at least a watermark, and the Step 150 to the Step 170 is about detecting the watermark.

Figure 2:
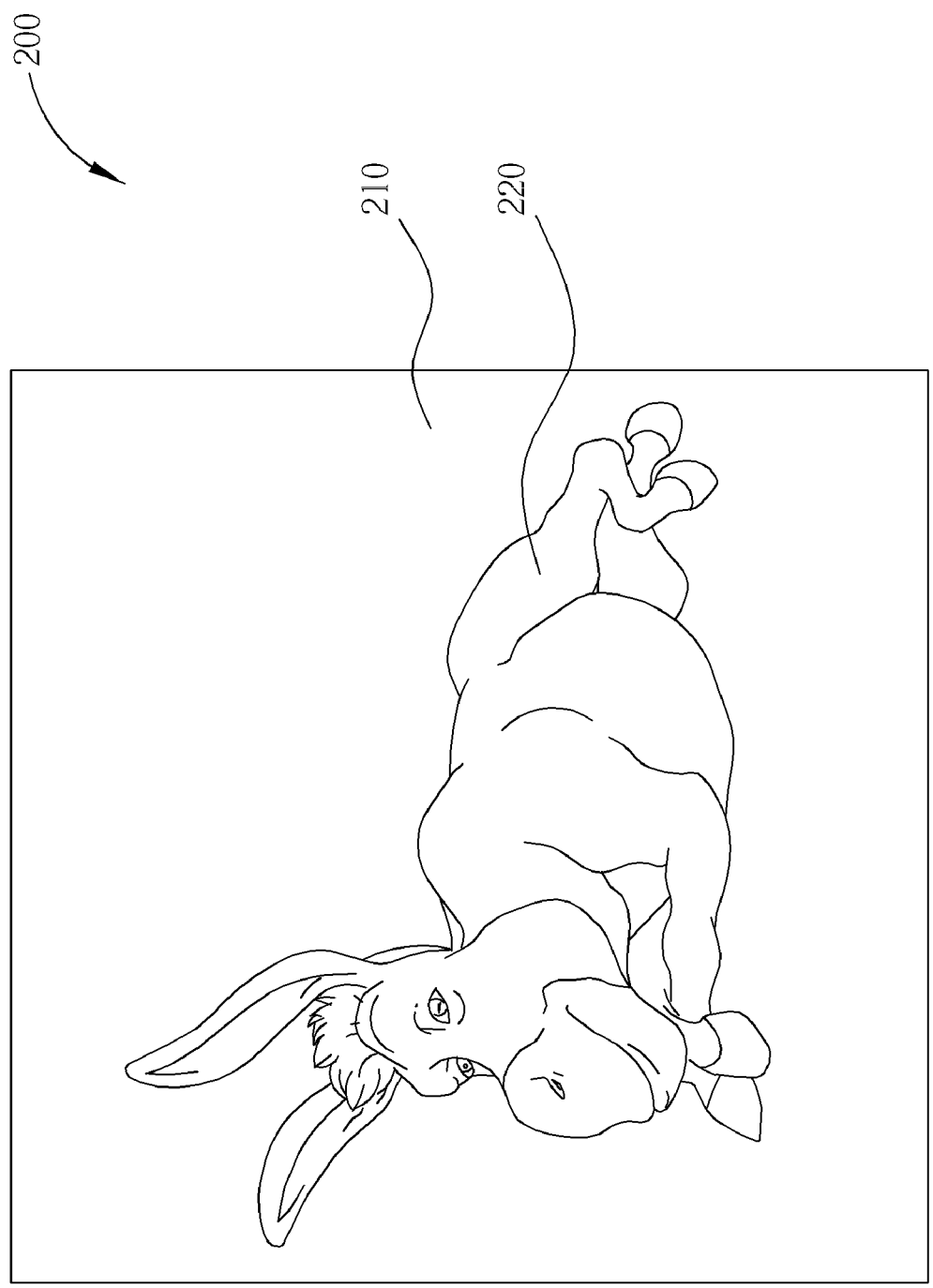
FIG. 2 is a selected image comprising a background and an object having a closed boundary.
Figure 3:
FIG. 3 shows a result of utilizing a flood-filling algorithm to fill a color for the background of the image shown in FIG. 2.
Figure 4:
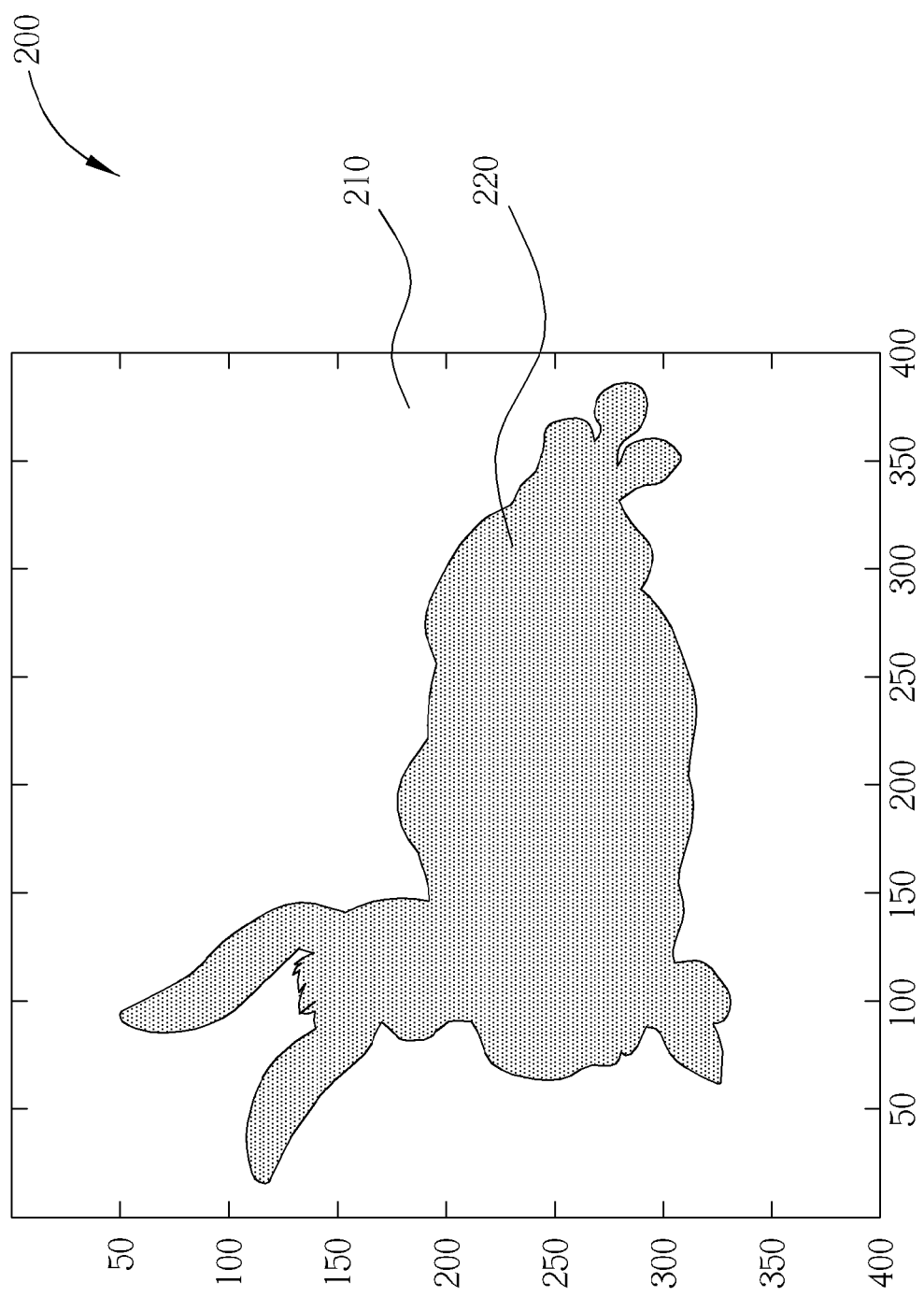
FIG. 4 shows a result of separating the object from the background of the image shown in FIG. 3 to obtain a borderline between the object and the background as the pattern having the closed contour line.
Figure 5:
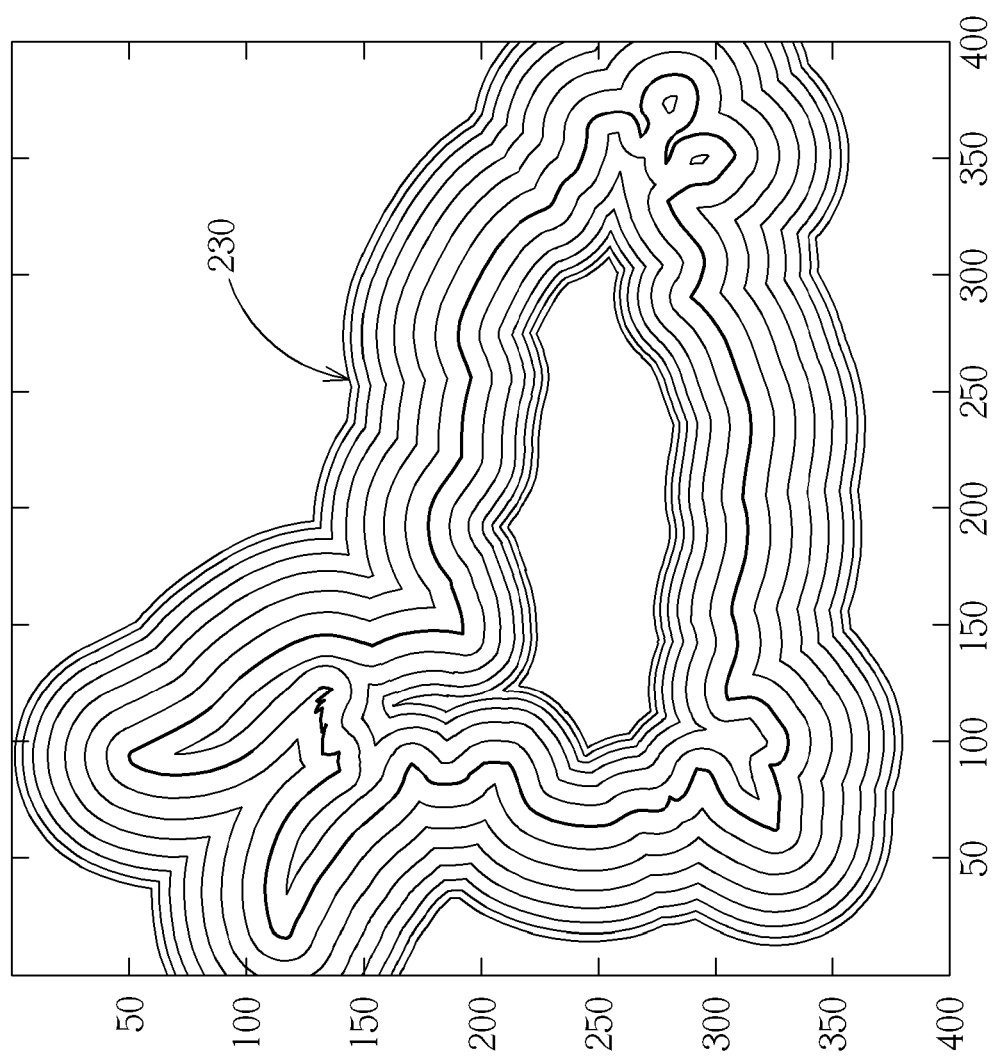
FIG. 5 shows a watermark corresponding to the image shown in FIG. 3.

For example, please refer to FIG. 2. FIG. 2 is a selected image 200 comprising a background 210 and an object 220 having a closed boundary. Next, the present invention protection method pre-processes the image 200 to generate a pattern having a closed contour line, and the Step 120 can comprises: utilizing a flood-filling algorithm to fill a color for the background 210 of the image 200 as shown in FIG. 3; and separating the object 220 from the background 210 of the image 200 to obtain a borderline between the object 220 and the background 210 as the pattern having the closed contour line as shown in FIG. 4 by assigning 1 for the object 220 region and assigning 0 for the background 210 region. Next, in the Step 130, the present invention protection method utilizes a fast marching method to make a signed distance function, and then shrink and expand the zero level set, wherein 20-pixel distance is used between contour lines. In addition, $5^{th}$ order accurate HJ-WENO scheme is used to evolve the level set equation. Please refer to FIG. 5. FIG. 5 shows a watermark 230 corresponding to the image 200 as the result of the Step 130. Next, in the Step 140, the present invention protection method embeds the watermark into a document 300 as shown in FIG. 6.

Next, in the Step 150, the present invention protection method divides the hard copy of the document into a plurality of blocks, and each of the blocks having a plurality of pixels. Next, in the Step 160, the present invention protection method detects a hard copy of the document to determine whether the watermark 230 exists in the hard copy of the document, wherein the Step 160 comprises: setting a watermark block number threshold (such as 1000 or 2000); determining a watermark block number of the hard copy of the document according to a color duration characteristic of the pixels in each of the blocks; comparing the watermark block number with the watermark block number threshold to generate a comparing result; and determining whether the watermark 230 exists in the hard copy of the document according to the comparing result.

Figure 7:
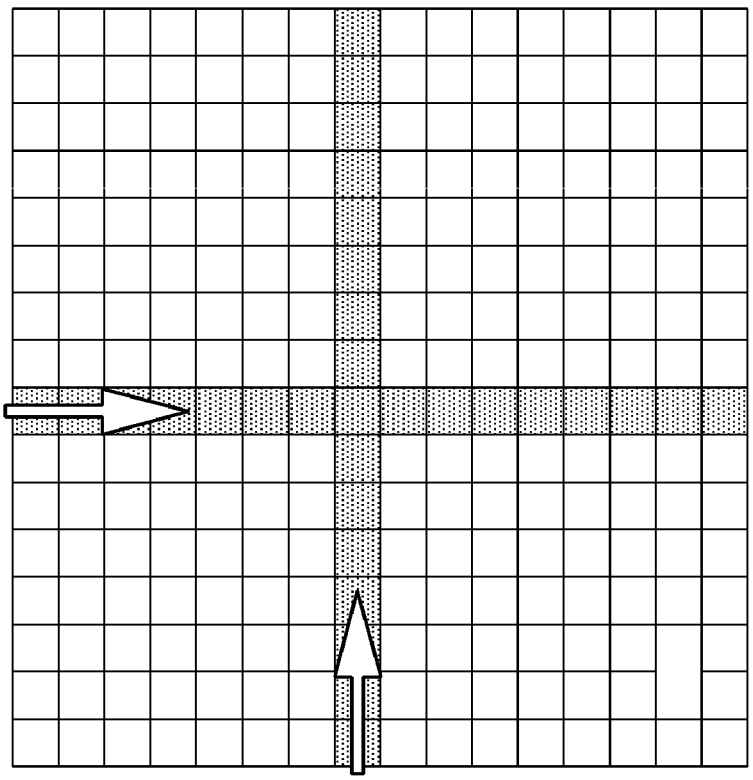
FIG. 7 shows a 4-directional texture searching algorithm.
Figure 7:
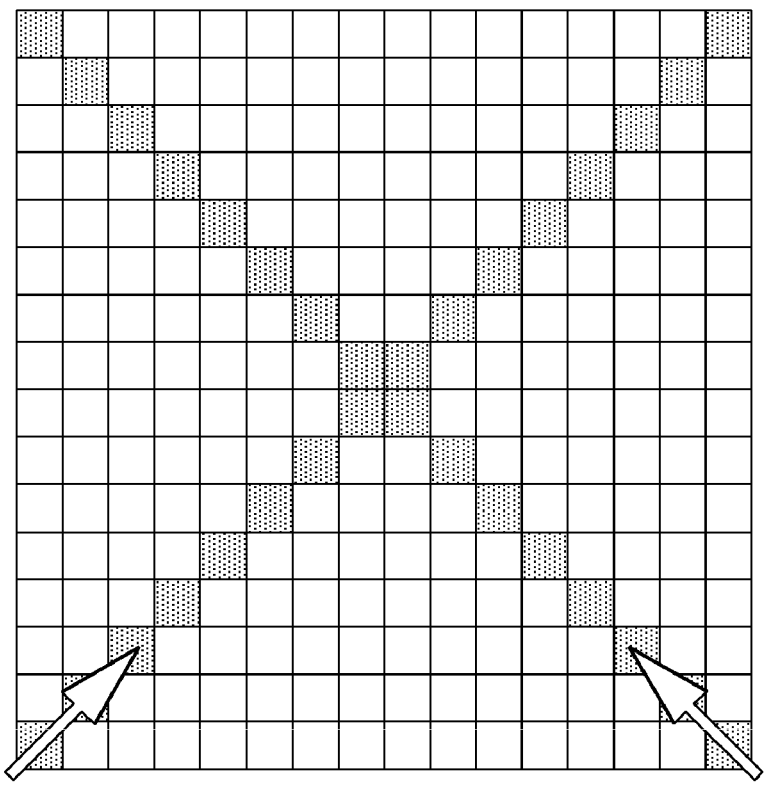
Figure 8:
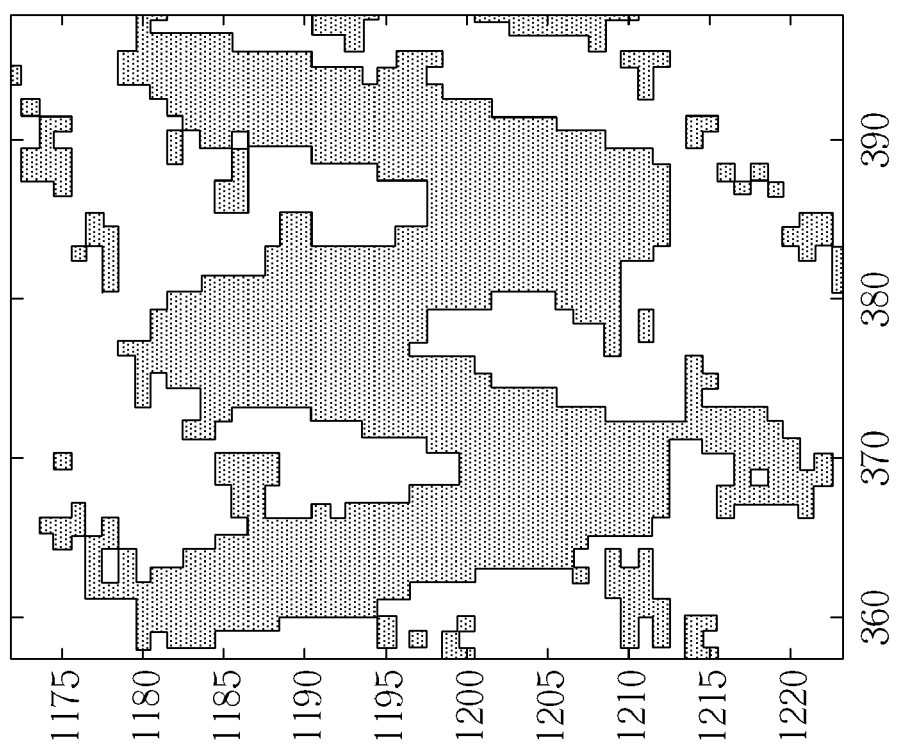
FIG. 8 shows a difference between text and watermark.
Figure 9:
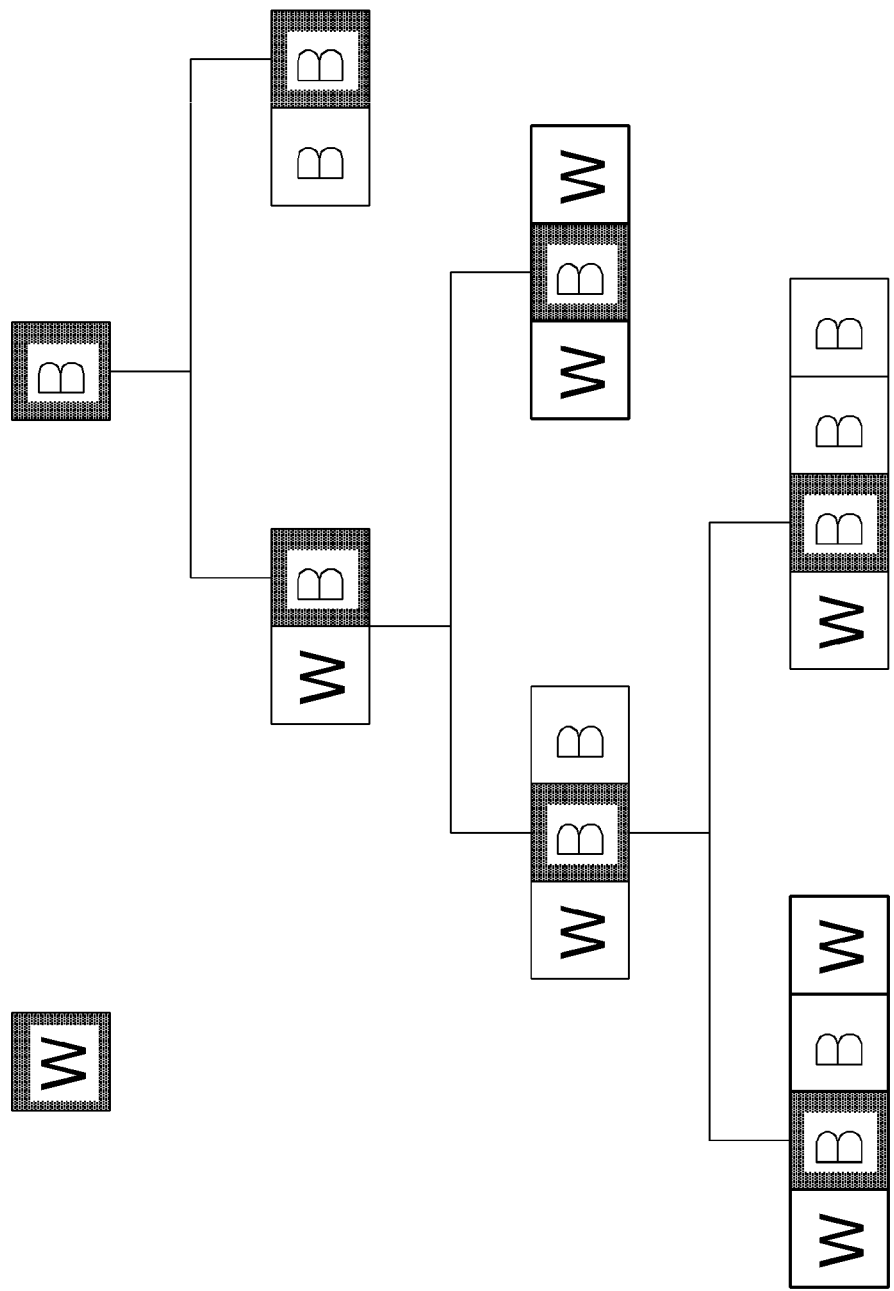
FIG. 9 shows an algorithm for finding watermark pixels.

The step of determining the watermark block number of the hard copy of the document comprises: utilizing a multi-directional texture searching algorithm to determine if the color duration characteristic of the pixels in each of the blocks meets a color duration characteristic of the watermark 230, wherein a block is considered as a watermark block when a color duration characteristic of the block meets the color duration characteristic of the watermark 230; and counting watermark blocks to determine the watermark block number of the hard copy of the document. For example, please refer to FIG. 7. FIG. 7 shows a 4-directional texture searching algorithm. It searches value changes of each block by 0, 45, 90, and 135 degrees lines. For each block, only the dotted pixels in FIG. 7 are traced for searching black/white color changes. But the 4-directional texture searching algorithm can not be used directly to search the watermark blocks because that algorithm also searches texture of the text. To divide texts from the embedded watermark, the color duration characteristic of the texture are added in the 4-directional texture searching algorithm. As shown in FIG. 8, the texture of the watermark logo occupies one or two pixels at least one direction in 4-directional searching algorithm but the text occupies at least 5 pixels. So if the color duration characteristic of the text is less than 2 pixels, then it is considered as a part of the watermark. In addition, only the white to black color changes are counted because the black to white color changes are exactly the same generally. In FIG. 9, the dotted and white boxes mean current and other pixels, respectively. Thus, if a current pixel is white (W), then the pixel is not watermark. If a current pixel is black (B), it is required to look into its previous pixel. If the previous pixel is white, it is required to further examine the next pixel, but if the previous pixel is black, then the current pixel is not a watermark pixel because only the white to black color change counts. For the same theory, it is practical to conclude that only two combinations of pixels can be considered as the watermark pixels which are highlighted as boxes having thick lines in FIG. 9. In an embodiment, the sum of 4 directional texture count is calculated and if the sum is greater than block_size/16, then that block is considered as a watermark block of the watermark 230. In addition, the present invention protection method determining the watermark 230 exists in the hard copy of the document when the watermark block number is greater than or equal to the watermark block number threshold. Next, in the Step 170, the present invention protection method forbids scanning or copying the document when the watermark 230 is detected in the document.

Briefly summarized, the present invention provides a protection method for preventing a hard copy of a document from being released or reproduced, and the protection method of the present invention can be applied to one of a copier, a scanner, a printer, and a multi-functional printer to produce a safe document control system having custom watermark design and detection algorithm.

Those skilled in the art will readily observe that numerous modifications and alterations of the device and method may be made while retaining the teachings of the invention.

What is claimed is:

1. A protection method for preventing a hard copy of a document from being released or reproduced, the protection method comprising:

selecting an image comprising a background and at least an object having a closed boundary;

pre-processing the image to generate a pattern having a closed contour line;

utilizing a level set method to process the pattern to generate at least a watermark; and embedding the watermark into the document;

dividing the hard copy of the document into a plurality of blocks, each of the blocks having a plurality of pixels;

detecting the hard copy of the document to determine whether the watermark exists in the hard copy of the document; and forbidding scanning or copying the document when the watermark is detected in the document;

wherein the step of detecting the hard copy of the document to determine whether the watermark exists in the hard copy of the document comprises:

setting a watermark block number threshold;

determining a watermark block number of the hard copy of the document according to a color duration characteristic of the pixels in each of the blocks;

comparing the watermark block number with the watermark block number threshold to generate a comparing result; and determining whether the watermark exists in the hard copy of the document according to the comparing result wherein the step of determining the watermark block number of the hard copy of the document comprises:

utilizing a multi-directional texture searching algorithm to determine if the color duration characteristic of the pixels in each of the blocks meets a color duration characteristic of the watermark, wherein a block is considered as a watermark block when a color duration characteristic of the pixels in the block meets the color duration characteristic of the watermark; and counting watermark blocks to determine the watermark block number of the hard copy of the document.

2. The protection method of claim 1, wherein the step of pre-processing the image to generate the pattern having the closed contour line comprises:
utilizing a flood-filling algorithm to fill a color for the background of the image; and
separating the object from the background of the image to obtain a borderline between the object and the background as the pattern having the closed contour line.

3. The protection method of claim 1, wherein the step of determining whether the watermark exists in the hard copy of the document according to the comparing result comprises:
determining the watermark exists in the hard copy of the document when the watermark block number is greater than or equal to the watermark block number threshold.

4. The protection method of claim 1, being applied to one of a copier, a scanner, a printer, and a multi-functional printer.

5. A protection method for preventing a hard copy of a document from being released or reproduced, the protection method comprising:
dividing the hard copy of the document into a plurality of blocks, each of the blocks having a plurality of pixels;
detecting the hard copy of the document to determine whether at least a watermark exists in the hard copy of the document; and
forbidding releasing or reproducing the document when the watermark is detected in the hard copy of the document;
wherein the step of detecting the hard copy of the document to determine whether the watermark exists in the hard copy of the document comprises:
setting a watermark block number threshold;
determining a watermark block number of the hard copy of the document according to a color duration characteristic of the pixels in each of the blocks;
comparing the watermark block number with the watermark block number threshold to generate a comparing result; and
determining whether the watermark exists in the hard copy of the document according to the comparing result;
wherein the step of determining the watermark block number of the hard copy of the document comprises:
utilizing a multi-directional texture searching algorithm to determine if the color duration characteristic of the pixels in each of the blocks meets a color duration characteristic of the watermark, wherein a block is considered as a watermark block when a color duration characteristic of the pixels in the block meets the color duration characteristic of the watermark; and
counting watermark blocks to determine the watermark block number of the hard copy of the document.

6. The protection method of claim 5, wherein the step of determining whether the watermark exists in the hard copy of the document according to the comparing result comprises:
determining the watermark exists in the hard copy of the document when the watermark block number is greater than or equal to the watermark block number threshold.

7. The protection method of claim 5, being applied to one of a copier, a scanner, a printer, and a multi-functional printer.

\* \* \* \* \*